United States Patent [19]

Gandola et al.

[11] Patent Number: 5,555,044

[45] Date of Patent: * Sep. 10, 1996

[54] MAGNETICS-ON-FILM IMAGE AREA RECORDING HEAD SUSPENSION SYSTEM

[75] Inventors: Kent R. Gandola, Carlsbad; Wlodzimierz S. Czarnecki, Rancho Santa Fe, both of Calif.

[73] Assignee: Eastman Kodak Company, Rochester, N.Y.

[*] Notice: The term of this patent shall not extend beyond the expiration date of Pat. No. 5,555,043.

[21] Appl. No.: 346,705

[22] Filed: Nov. 30, 1994

[51] Int. Cl.⁶ ................................................ G03B 17/24
[52] U.S. Cl. ........................... 354/106; 360/3; 360/104
[58] Field of Search .................................. 354/105, 106, 354/76; 360/1, 3, 104

[56] References Cited

U.S. PATENT DOCUMENTS

| | | | |
|---|---|---|---|
| 2,962,558 | 11/1960 | Hoshino | 179/100.2 |
| 4,212,043 | 7/1980 | Baker | 360/104 |
| 4,449,155 | 5/1984 | Meier et al. | 360/104 |
| 4,669,016 | 5/1987 | Schmid et al. | 360/122 |
| 4,910,629 | 3/1990 | Mitsuhashi et al. | 360/121 |
| 4,933,780 | 6/1990 | Wash et al. | 360/1 |
| 4,977,419 | 12/1990 | Wash et al. | 354/76 |
| 5,006,873 | 4/1991 | Wash | 354/106 |
| 5,025,283 | 6/1991 | Robison | 355/40 |
| 5,034,836 | 7/1991 | DeMarti, Jr. et al. | 360/104 |
| 5,041,933 | 8/1991 | DeMarti, Jr. et al. | 360/104 |
| 5,126,904 | 6/1992 | Sakurai | 360/104 |
| 5,146,378 | 9/1992 | Makino et al. | 360/121 |
| 5,187,625 | 2/1993 | Blaeser et al. | 360/104 |
| 5,231,438 | 7/1993 | Smart | 354/281 |
| 5,237,475 | 8/1993 | Kazama et al. | 360/104 |
| 5,264,979 | 11/1993 | Schandl et al. | 360/109 |
| 5,274,522 | 12/1993 | Taillie | 360/130.3 |
| 5,276,472 | 1/1994 | Bell et al. | 354/76 |
| 5,282,102 | 1/1994 | Christianson | 360/104 |
| 5,285,324 | 2/1994 | Weigand et al. | 360/3 |
| 5,307,100 | 4/1994 | Kubo | 354/105 |
| 5,321,452 | 6/1994 | Tsujimoto | 354/106 |
| 5,349,484 | 9/1994 | Koehler | 354/106 X |
| 5,450,149 | 9/1995 | Cocca | 354/106 |
| 5,469,313 | 11/1995 | Isozaki et al. | 354/106 |

*Primary Examiner*—A. A. Mathews
*Attorney, Agent, or Firm*—William F. Noval

[57] ABSTRACT

A photographic still camera for receiving an elongated filmstrip having a cross-film curvature and having a substantially transparent magnetic layer deposited on the film surface and recording or reproducing information on or from the magnetic layer in the image frame areas of the filmstrip. The filmstrip is transported from supply to takeup chambers between film rails and a backing plate past a camera image frame exposure aperture with the magnetic layer facing the backing plate and having a concave cross-film curvature near one side of the exposure aperture. A plurality of inverted gull wing shaped, spring flexure elements are positioned to extend across the magnetic layer at the side of the exposure aperture. Each flexure element has a fixed mounting plate attached to the backing plate coupled through an angled fixed leg to a mounting platform which in turn is coupled through a further angled leg back to a further plate such that the mounting plate is suspended toward the filmstrip magnetic layer. Magnetic recording head elements mounted to the mounting plates contact the magnetic layer across a variable spacing. Pitch motion is provided through the flexible legs in response to changes in filmstrip advancement tension. Roll motion compliance with the concave cross-film curvature is provided by a mounting platform gimball mechanism.

20 Claims, 5 Drawing Sheets

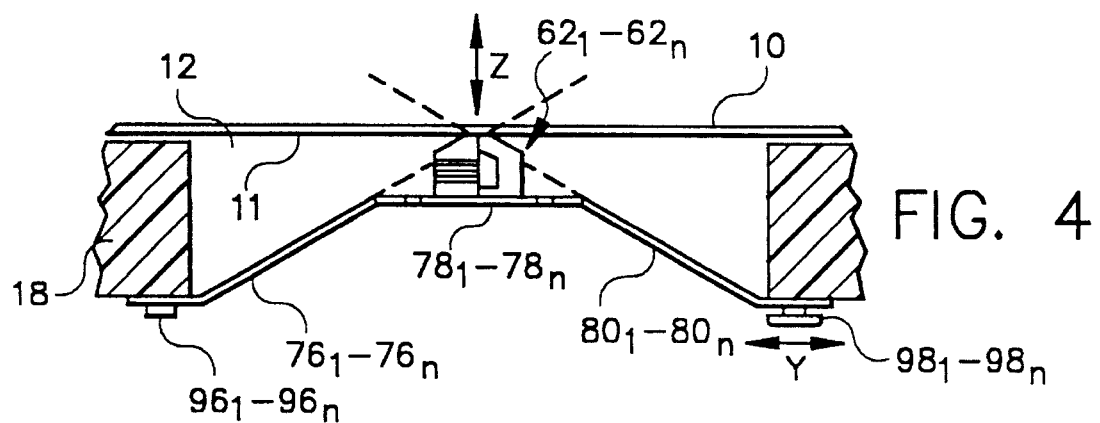
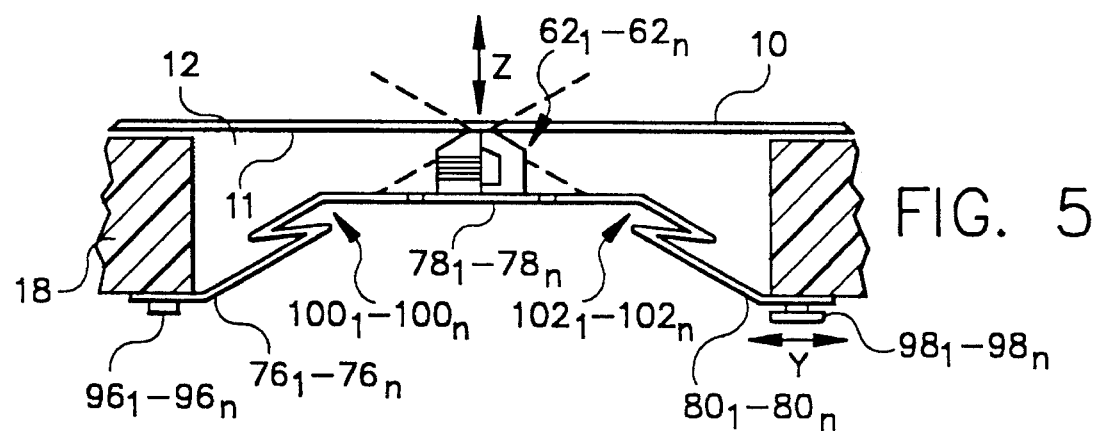
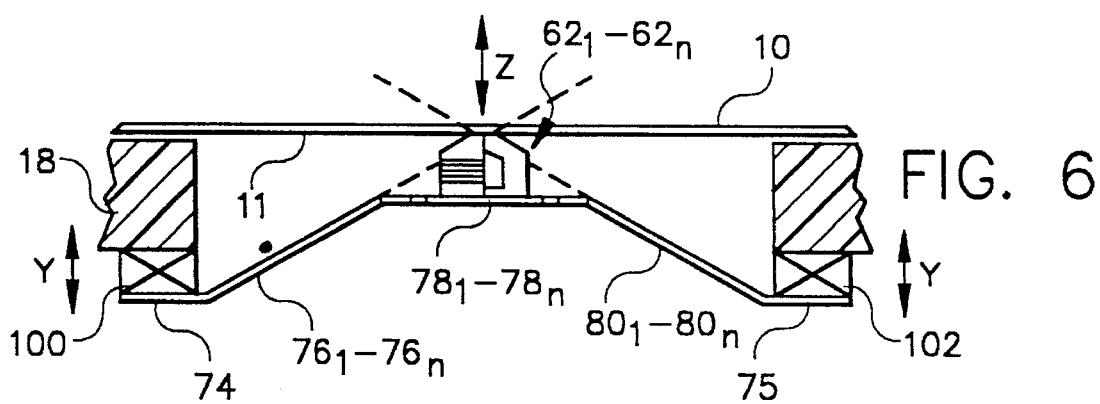
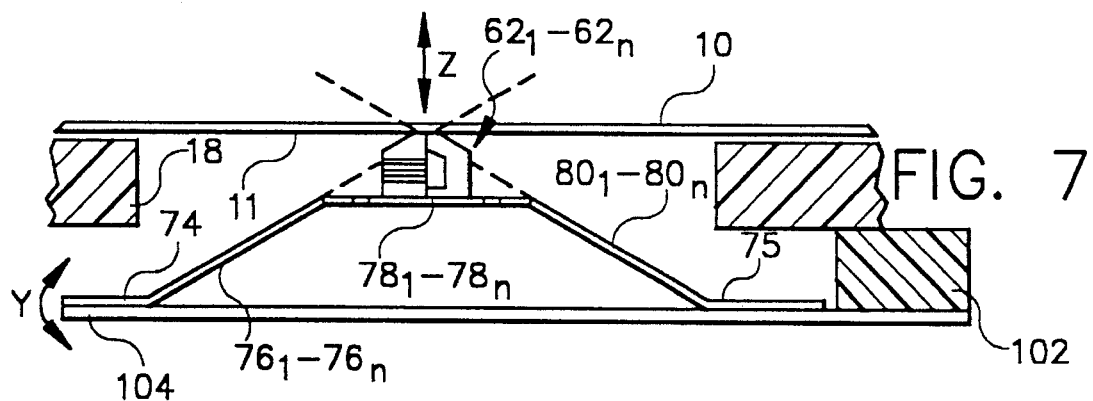

MAGNETICS-ON-FILM IMAGE AREA RECORDING HEAD SUSPENSION SYSTEM

CROSS-REFERENCE TO RELATED APPLICATIONS

Reference is hereby made to commonly assigned, co-pending U.S. patent application Ser. Nos.: 08/333,532, filed Nov. 2, 1994, in the names of W. Stanley Czarnecki et al. and titled MAGNETICS-ON-FILM IMAGE AREA RECORDING HEAD AND INTERFACE; 08/346,995 filed Nov. 30, 1994, in the names of G. William Brock et al. for MAGNETICS-ON-FILM IMAGE AREA RECORDING HEAD WITH FILM FLATTENING EMULSION SIDE SUPPORT; and Ser. No. 08/346,997 filed Nov. 30, 1994, in the names of G. William Brock et al. for MAGNETICS-ON-FILM IMAGE AREA RECORDING HEAD AND SUSPENSION SYSTEM where various alternative approaches and solutions are set forth to the problems of the prior art.

FIELD OF THE INVENTION

This invention relates to magnetic recording and reproducing heads (for simplicity, referred to herein as recording heads) particularly for use for recording and reading information on a magnetics-on-film (MOF). layer in the image area of photographic filmstrips and particularly to the configuration and mounting of such recording heads on a suspension system to achieve high compliance with the relatively stiff filmstrip and MOF layer in cameras or other filmstrip handling apparatus.

BACKGROUND OF THE INVENTION

In Commonly assigned U.S. Pat. Nos. 4,933,780, 4,977, 419, 5,006,873, 5,025,283, and 5,276,472, a photographic filmstrip having a virtually transparent, magnetic film layer covering the non-emulsion side of the filmstrip (referred to as an MOF layer) is disclosed in conjunction with various camera systems. Potential longitudinal recording tracks are illustrated in the MOF layer in both the image frame area and on either side of the image frame area for recording information such as film type, film speed, film exposure information and information relevant to the processing and subsequent use (e.g., printing) of the exposed image frames. The systems disclosed therein provide for recording of information during film manufacture, reading and/or recording of information on certain tracks during camera use, and reading and/or recording of printer related information during photofinishing. The information recorded during camera use may include voiced messages or sound associated with the photographed scene and may be recorded in digital or analog format on certain of the tracks.

The specific camera recording tracks and recording heads disclosed in the '419 and '780 patents are disposed to record in tracks located along the longitudinal edges of the film and outside the MOF layer in the image frame area. Further commonly assigned U.S. Pat. Nos. 5,034,836, 5,041,933, 5,274,522 and 5,285,324 and U.S. Pat. No. 5,307,100 disclose magnetic recording head configurations for use in recording in longitudinal tracks alongside the filmstrip edges but not in the image frame area.

The above-referenced patents showing magnetic recording heads along the edges of the filmstrip outside the image area generally teach providing pressure pad supports or rollers on the emulsion side opposite from the recording heads and continuous motion of the recording medium to ensure reliable recording. In the above-referenced '100 and '324 patents, various configurations for mounting a magnetic recording head in relation to the film transport path and film plane with the use of an oppositely disposed pressure rollers are disclosed in a camera.

In the above-referenced '780 patent, a different approach is taken wherein the recording head of the camera is positioned with respect to the chamber for receiving a modified film cartridge. The recording head bears against the MOF layer of a filmstrip exposed through an opening in the film cartridge lip. The film is supported and flattened within the lip, and the emulsion bears against a compliant support formed with a light blocking plush material overlying a lower flange of the cartridge lip.

The '780 patent also suggests that an elongated array of recording heads may be positioned to penetrate an elongated opening in the cartridge lip, relying on the plush as a backing support. The approach taken in the '780 patent requires the acceptance of a new film cartridge standard in the industry, and the use of plush material to block light entry through the opening.

None of the above-referenced patents specifically disclose magnetic recording head arrays (i.e., multi-head arrays) or any specific support structures for each magnetic recording head element for recording or reproducing in a plurality of tracks in the MOF layer on the side of the film opposite to the image frame area or support structures. Reading and recording information on tracks of a magnetic coating or stripes of magnetic coatings in the image frame area on photographic film in a still camera require solutions to problems different than those encountered in other magnetic media recording apparatus.

In a disk drive, the recording head flies or floats on the air film that is created as the nominally flat surface of the magnetic disk rotates at high speed on an actuator assembly as shown in U.S. Pat. No. 5,282,102, for example. The disk is not inherently curved or irregular as it rotates, and close recording head compliance can be attained. Pitch and roll of the magnetic recording head to follow minute irregularities in the magnetic disk surface is allowed by the configuration of the mount at the free end of the loading arm of the actuator assembly.

In a tape drive, the magnetic tape is flexible enough under tension to conform to the recording head contour both in the tape feed direction and in the cross-tape direction. Magnetic tape is quite thin and exhibits virtually no stiffness. And recording is done with the magnetic tape moving at a constant speed.

Photographic film, however, is of much greater thickness than the magnetic tape used for commercial and consumer recording and reproduction and is neither compliant nor inherently flat. When removed from its cartridge, a filmstrip shows a relatively high stiffness and very observable cross-curvature across its width that is convex on the non-emulsion side of the film. Further, the unwrapped filmstrip also shows a convex curvature along its length, again on the non-emulsion side of the film. This latter curvature is attributed primarily to a core-set curl that results from the filmstrip having been tightly wound on a film cartridge spool.

The cross-film curvature across the width of the filmstrip is primarily caused by the number of multilayers of emulsion and MOF layer (if present). The emulsion multilayers (and MOF layer, if present) have different stretch properties than that of the base film substrate of acetate, PET, or PEN material. The cross-Curvature is also influenced by the bending phenomena known as anticlastic curvature. The degree of filmstrip cross-curvature also depends on environmental conditions, including the time and temperature history of the film, the relative humidity, and the thickness of the film. Because of the cross-film curvature, it is difficult to achieve good contact or compliance across the width of a wide, multi-head array. To provide a reliable read or write signal, the magnetic recording head must remain in close proximity to the magnetic coating. Any disturbances, such as variations in film curl, can vary the relationship of the recording head to the magnetic coating and decrease the reliability of the signal.

The space limitations in a portable hand held still camera, which necessarily must be as compact and light as possible to appeal to the average consumer, restrain the size and location of the magnetic recording head and the film drive system. In the cameras described in the above-referenced patents, the information is intended to be recorded in the MOF layer in the longitudinal tracks (defined by recording head spacing positions across the filmstrip) along the edge of or across the image area opposite to the exposed image frame, so that this information can be recombined with the image, even if the negatives are subsequently separated into individual image frames. Because of this requirement, the magnetic recording must take place downstream of the camera exposure gate area while the filmstrip is advanced to the next exposure. The exposure gate region in the camera where images are exposed is designed with film rails and a backing plate to confine and control the photographic filmstrip curvature to ensure that objects are optimally and uniformly focused by the camera lens across a given frame. The planarity of the film in other areas within the camera, specifically the downstream area, is not as carefully controlled. Thus, the filmstrip is susceptible to a greater degree of non-planarity associated with spooling, film cross-curvature, edge conditions, and other plastic deformations resulting from time, humidity, and temperature exposure described above.

The film motion during recording takes place in a frame stepping mode by means of a pulse of tension (i.e., jerking or jogging motion). When the pulse of tension is applied to a stationary filmstrip, the film tension conditions at the recording head/MOF layer interface are highly variable compounding the problems associated with the non-planarity and noncompliance of the filmstrip.

Of particular importance, the recording head-to-film interface must avoid scratching the MOF layer or the emulsion layers or the image quality will be degraded. The above-referenced patents related to the MOF layer on the filmstrip that show recording head structure are largely silent as to how to overcome these problems with recording in the image frame area.

The magnetic recording process requires that a recording head gap be in close proximity or contact with the magnetic media. Wide or non-uniform spacing separations between the recording head gap and the MOF layer result in lower recording density or a degraded signal. Maintaining a uniform contact or spacing of the recording head gaps with the MOF layer, without distorting the natural filmstrip curvature or the flatness of the filmstrip achieved in the exposure gate, is a challenge due to the films' non-planar nature and stiffness as described above.

PROBLEMS TO BE SOLVED BY THE INVENTION

The invention is directed to solving the above stated problems of recording and reproducing information on MOF layers of a filmstrip in a camera or in other filmstrip processing, handling or other apparatus while avoiding damage to the filmstrip in the image frame area.

SUMMARY OF THE INVENTION

It is therefore a primary object of the invention to enhance the compliance of a magnetic recording head with the MOF layer of a filmstrip for recording and/or reproducing information accurately in a plurality of tracks in the image area of the MOF layer without negatively affecting the quality of the photographic image.

It is a further object of the present invention to provide a system for suspending a multi-head array extending across the filmstrip in such a fashion that each recording head element compliantly follows the contour of the filmstrip to the extent that it exhibits cross curvature and exerts a uniform, low force against the MOF layer.

The invention is realized in a first aspect in a magnetic record/reproduce apparatus for recording and/or reproducing information in relation to image frame areas of a photographic filmstrip in the magnetic layer on a surface of the photographic filmstrip, the filmstrip having a cross-film curvature across the width thereof, the apparatus comprising: means for defining an elongated filmstrip transport path having a backing plate on one side of the filmstrip transport path; means for advancing the filmstrip in a longitudinal direction in the filmstrip transport path from a filmstrip supply to a filmstrip takeup, whereby the filmstrip advanced alongside the backing plate exhibits the cross-film curvature and the space between the backing plate and the filmstrip magnetic layer varies across the width thereof; a plurality of magnetic recording heads adapted to be suspended with respect to the backing plate to extend across the filmstrip in a spaced apart array for recording and/or reproducing information in tracks in the magnetic layer, the tracks extending in the longitudinal direction and across the image frame areas; and suspension means having a like plurality of flexure elements for suspending each of the plurality of magnetic recording heads in the array within the variable space in loading contact compliance with the cross-film curvature of the filmstrip magnetic layer, each flexure element having a mounting platform for mounting a magnetic record/reproduce head and first and second movable flexure legs attached at opposite ends thereof and extending from the backing plate into the record/reproduce aperture and toward the filmstrip magnetic layer to provide loading force through the magnetic record/reproduce head against the magnetic layer, the mounting platform having means for allowing roll motion of the magnetic head mounted to the mounting platform to conform with the cross-film curvature across the contact width of the recording heads with the magnetic layer.

Preferably, the first and second legs and the mounting platform of each of the flexure elements is formed of a thin, resilient material into a gull wing shaped suspension spring member having the mounting platform intermediate the first and second angled legs and extending toward the filmstrip transport path and providing the magnetic record/reproduce head mounted thereto with the capability for pitch motion to conform with changes in tension in the advancement of the filmstrip past the record/reproduce aperture in the longitudinal direction, the pitch motion effected through bending motion of the first and second angled legs.

The legs may have a variety of shapes and be fixedly or slidably attached to the backing plate to extend across a record/reproduce aperture in an array. Alternatively, the first and second legs may be fixedly attached to a cantilever beam or to separate spring elements attached to the backing plate.

Preferably, each magnetic recording head is configured to exhibit a contoured profile in the film transport and cross-film directions for ensuring a high degree of compliance of the magnetic recording head with the magnetic layer of the filmstrip at the particular position of contact across the variable spacing without damaging the filmstrip.

The invention is preferably implemented within a camera where the filmstrip is transported through a camera exposure gate for exposing image frames in the photosensitive layers of the filmstrip on the opposite side of the filmstrip from the MOF layer. In this regard, the array of flexure elements and mounted recording heads is preferably aligned along one side of the camera exposure gate where the filmstrip exhibits a convex cross-curvature.

The invention may also be practiced in other filmstrip transport apparatus associated with film manufacture in order to pre-record information in certain tracks or in processing of the exposed filmstrips to develop the image frames or in making prints from the image frames in order to record further information in other tracks or for any other reason that it may prove useful to read information from or write information into the tracks and read or record information into selected tracks of the MOF layer.

ADVANTAGES OF THE INVENTION

In accordance with the present invention, and due to the various features thereof, a recording head-to-film interface in the film transport path that enables near-contact compliance over the width of multiple tracks, and over a large area around the individual magnetic recording head element gaps, is achieved. The head-to-film interface is operable over the broad range of film cross-curvatures that might be encountered. In addition, the invention provides a stable recording interface insensitive to the transient nature of film tension, while the film is advanced from frame to frame. Furthermore, the interface does not require emulsion side support, nor does it generate any significant surface damage to the MOF surface in the image frame area.

The recording head suspension system provides the magnetic recording head with the ability to comply to the shape variations of the photographic media. Because of the capability of following the out-of-flatness of the filmstrip in both the longitudinal and cross-film directions, the head load can be minimized without risking spacing variations. This reduced loading will, in turn, greatly minimize the possibility of film scratching.

The particular suspension system provides the pitch, roll, and loading motions required, but keeps these motions decoupled to the extent that the stiffness of each can be optimally designed. Another advantage of the present invention is that it places the virtual pivot of the pitch motion exactly coincident with the gap, so that the gap always remains in contact with, or at the point of least separation from, the film. Finally, this suspension system design can be fabricated for single or multiple recording head structures in high or low volume for reasonable cost.

BRIEF DESCRIPTION OF THE DRAWINGS

These and other objects, advantages and features of the invention will become apparent from the detailed description given hereinafter in relation to the accompanying drawings, in which:

FIG. 4 depicts the elongated flexure support of FIG. 3 in a side view illustrating the virtual pivot of the pitch motion and its relationship to the recording head gap in complying with the filmstrip;

FIG. 5 depicts in a side view a variation in the configuration of the elongated flexure support of FIG. 3;

FIGS. 6 and 7 depict in side views variations on the manner of attaching the elongated flexure supports of FIGS. 3–6 to the camera backing plate.

The figures are not necessarily to scale.

DETAILED DESCRIPTION OF THE PREFERRED EMBODIMENTS

Figure 1:
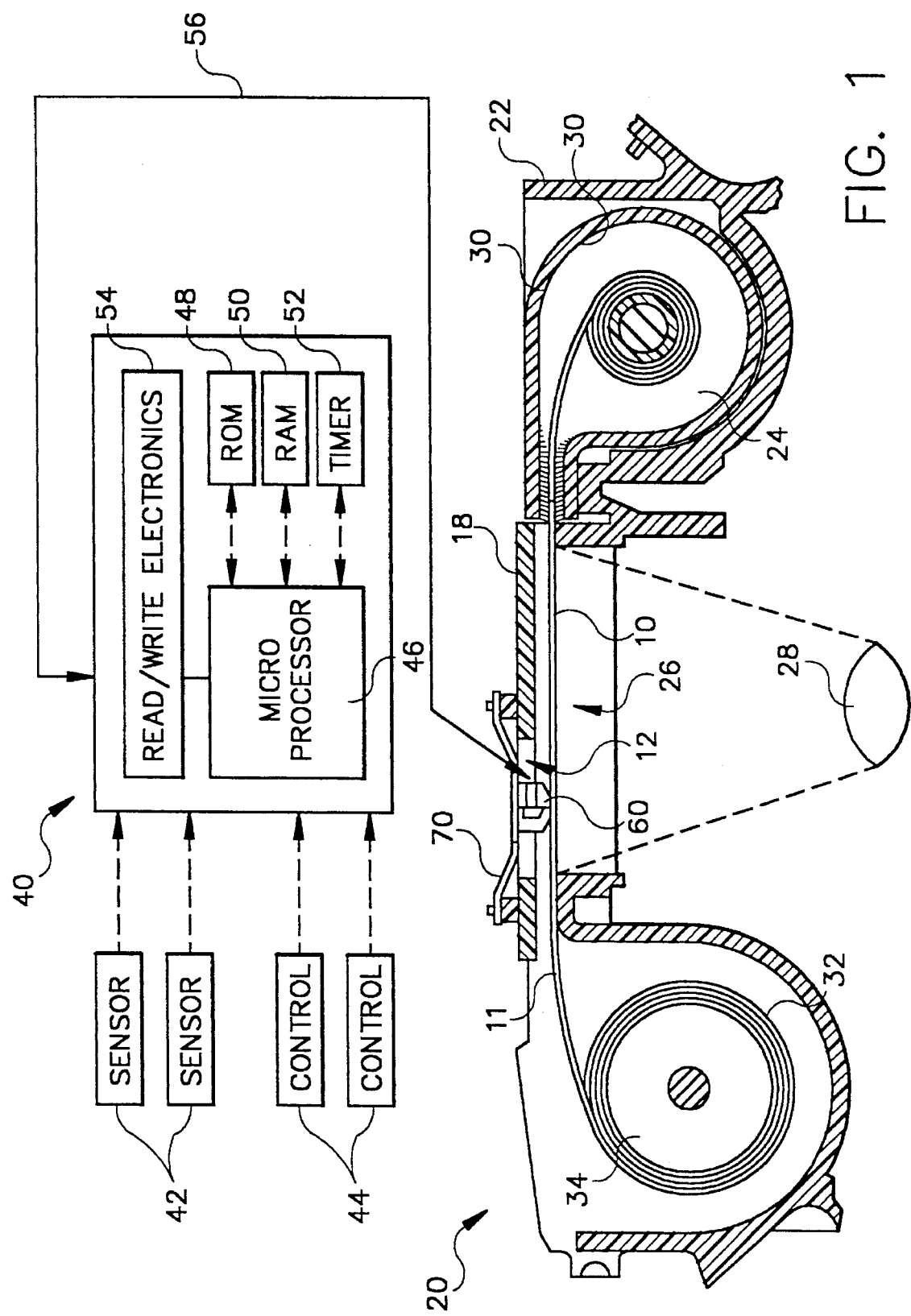
FIG. 1 is a schematic illustration of the components of a camera in which the present invention may be practiced.

The present invention preferably employs a photographic filmstrip of the type described in detail in the above-referenced '873 patent, for example, incorporated herein by reference, having the optically transparent MOF layer continuously coated on the non-emulsion side of the filmstrip base. A camera system for recording information into spaced parallel tracks in the MOF layer employing such a filmstrip 10 is depicted in FIG. 1 and may take the form depicted in the above-referenced '780 or '873 patents. FIG. 1 schematically illustrates any such camera, and features not necessary for an understanding of the present invention have been omitted or shown in block diagram to simplify the disclosure.

The schematically illustrated section of camera 20 comprises a frame or housing 22 having a chamber 24 at one end thereof for receiving a film cartridge 30. The cartridge 30 as depicted takes the form of a conventional 35 mm cartridge having a passive light lock through which the filmstrip 10 is withdrawn an image frame at a time for exposure and rewound after exposures are complete. The film cartridge may take the form of a "thrust" style cartridge with an active light lock, of the type disclosed in commonly assigned, U.S. Pat. No. 5,231,438, having a door through which the filmstrip 10 is advanced for exposure and rewound after all frames are exposed. In either case, as is well known in the art, the film cartridge 30 is inserted into the chamber 24 through the camera back or a film loading chamber door (not shown) so that when either is closed, the cartridge 30 is fixedly held in the orientation shown in FIG. 1. Since such camera and cartridge interface features are well known in the art, further description is deemed unnecessary.

From the cartridge 30, the filmstrip 10 is transported in a film transport path across a rectangular exposure gate opening 26 aligned with a camera taking lens 28, shutter and aperture etc., to a film take-up chamber 32 where it is wound on the take-up spool 34. Mechanisms for accomplishing such film transport are well known in the art. Typically, they operate to advance the filmstrip 10 an image frame at a time from the cartridge 30 to the take-up spool 34 after each image frame exposure.

All camera operations in advancing and rewinding the filmstrip and controlling the exposure of image frames, electronic flash illumination and the like are controlled by an electronic control system 40 which responds to sensor inputs 42 and camera controls 44. The electronic control system 40 is provided with a pre-programmed microprocessor 46 coupled with ROM 48 and RAM 50 and a timer 52. Other elements of the camera 20 include a conventional metering system for monitoring advance of the filmstrip, a shutter release mechanism (not shown), conventional automatic focus and exposure control systems (not shown), a conventional digital frame counter, as well as display and user interface switches (not shown) among the controls 44. These components are also all controlled from the electronic control system 40 by microprocessor 46 in a manner well known in the art of still cameras, and since they form no part of the present invention, further description is deemed unnecessary.

Microprocessor 46 also operates the read/write electronics block 54 to record in or read information from tracks in the MOF or magnetic layer 11 of the filmstrip during each advancement of the filmstrip 10 between the cartridge 30 and takeup chamber 32. The information to be recorded is described above and may include order related information to be magnetically recorded on the filmstrip 10 from the camera user through camera controls 44, such information pertaining to the number of prints desired for a given frame, by frame number, for example, or the name and address of the camera user for ultimate use by the photofinisher, or a title of the scene or event being photographed in any of the methods described in the above-referenced commonly assigned patents. The microprocessor 46 may also accept scene exposure related information from sensors 42 to be magnetically recorded on the filmstrip 10 for ultimate use by the photofinisher. Such information may include camera identification, orientation of the camera to the scene being photographed, scene luminance, aperture setting and shutter speed, and the like.

FIG. 1 also depicts a magnetic record/reproduce multihead array or recording head 60 coupled to the read/write electronics block 54 through a signal line 56. While schematically depicted in an end view in FIG. 1, it will be understood from the following description that the magnetic recording head 60 is an array of discrete record head elements $62_{1-62n}$ formed in a linear multi-head array in a manner to be described. The magnetic recording head 60 is positioned in an elongated record/reproduce gap or opening 12 in the backing plate 18 to make contact with the filmstrip magnetic layer 11 in the image frame area. The backing plate 18 comprises a flat rectangular plate having planar dimensions complimentary with the rectangular exposure opening 26 and having the elongated record/reproduce opening 12 formed therein. Before describing the details of the magnetic recording head 60 and its suspension in the opening 12, references first made to FIG. 2.

Figure 2:
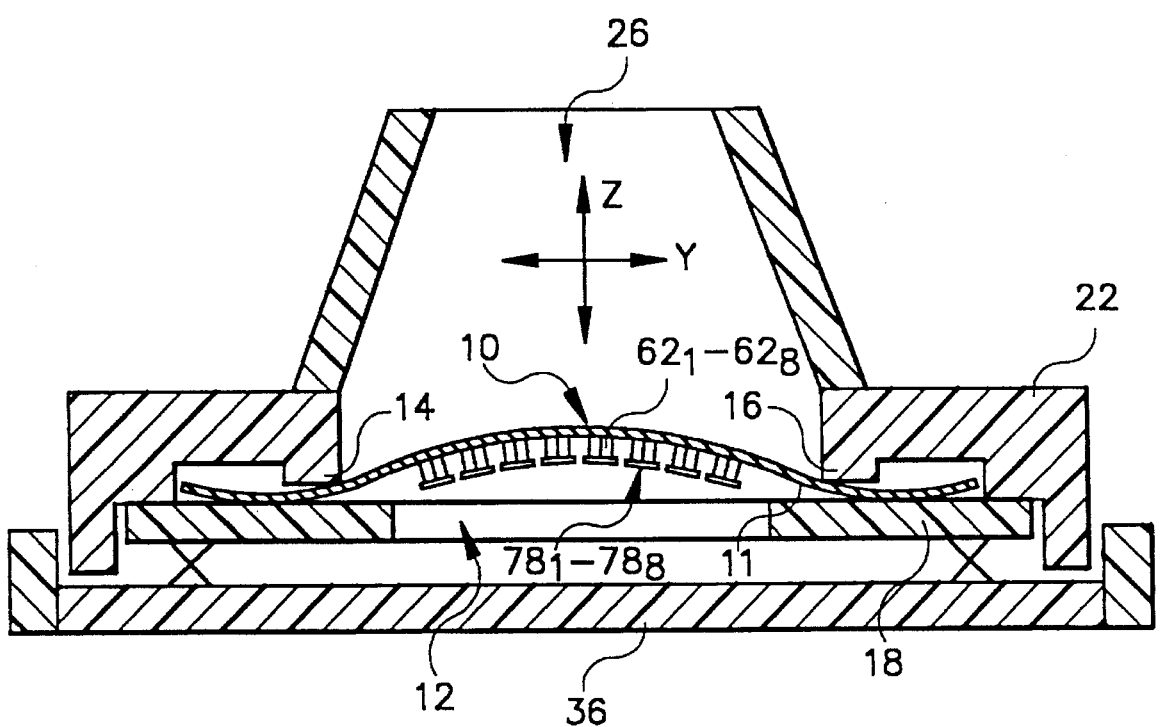
FIG. 2 is a partial cross-section view of the cross-film curvature of the filmstrip in the film transport path and the required pitch and roll suspension of the magnetic recording head elements in the camera of FIG. 1.

FIG. 2 is an end cross-section view of the film transport path in the exposure gate 26 depicting in exaggerated fashion, the cross-film curvature or curl across the width of filmstrip 10 and the variable spacing of the filmstrip 10 from the backing plate 18 with filmstrip advance motion. The concave (as viewed from the magnetic layer 11) cross-film curl depicted in FIG. 2 is present when the filmstrip 10 is constrained longitudinally along its edges between a pair of film rails 14 and 16 formed in camera housing 22, extending along opposite sides of the rectangular exposure gate opening 26, and the backing plate 18.

After loading the film cartridge 30 and directing the leading end of the filmstrip 10 into the take-up chamber 32, the camera back 36 or the film loading chamber 24 is closed. The spring loaded backing plate 18 urges the edges of the filmstrip 10 with slight pressure toward the rails 14, 16 as the filmstrip 10 is advanced through the film transport path. The constraining moment of force applied along the filmstrip side edges in the vicinity of the rails 14, 16 actually causes the free state convex (as viewed from the magnetic layer 11) cross-film curvature to be reversed to the concave cross-film curvature shown in FIG. 2.

More specifically, the filmstrip 10 is typically confined within a film transport gap from 150–300 µm. The backing plate 18 will tend to remove longitudinal curl resulting from film core set in the cartridge 30 and reverse the cross-film curvature across the filmstrip 10. Since the filmstrip 10 is unsupported transversely on its emulsion side, the depicted concave cross-film curl in the out-of-flatness tolerance range of 25–100 µm still exists during film exposure but not enough to noticeably degrade the image. The filmstrip 10 bows away from the backing plate 18 in the center of the camera exposure gate 26 and towards the backing plate 18 at the end of the camera exposure gate 26 by an amount dependent on the cross-curvature of the particular filmstrip.

In a typical still camera, the spacing between the backing plate 18 and the rails 14, 16 is in the range of 0.25–0.45 mm as a result of manufacturing tolerances. The photographic filmstrip 10 used in such a camera is typically 0.15 mm thick. Accordingly the filmstrip edges may not actually engage the rails 14, 16. Due to the transverse film curl, the extreme edges of the filmstrip 10 may actually engage camera frame surfaces outside the rails 14, 16 with the curl bias causing most of the width of the filmstrip 10 to engage the backing plate 18. Because of this result, the camera lens 28 is typically focused on a film plane next to the backing plate 18.

As mentioned above, the degree of concave cross-film curl is greatly exaggerated in FIG. 2. However, it will be understood that even the small cross-film curvature causes loss of compliance with the individual recording heads if the elements are arrayed in a rigid, straight support and the gaps that occur degrades performance. Moreover, the edges of the individual recording heads can scratch the filmstrip magnetic layer 11.

Moreover, the start-stop acceleration and deceleration jerkiness of the filmstrip advance motion described above combined with the cross-film curl and film stiffness characteristics of the filmstrip 10 also cause uneven variations in instantaneous cross-film curvature and distance between the MOF layer of the filmstrip 10 and the backing plate 18 shown in the example of FIG. 2. This translates into instantaneous changes in forces applied by the filmstrip 10 on the recording heads and changes in the recording head/MOF layer compliance.

The present invention involves the realization that a high degree of compliance and recording head performance can be attained during static and dynamic conditions without the use of a backing support contacting the emulsion side of the filmstrip 10 and that the recording heads can be positioned in the exposure gate area 26 where the cross-film curvature is concave on the MOF layer side as shown in FIG. 2.

Figure 3:
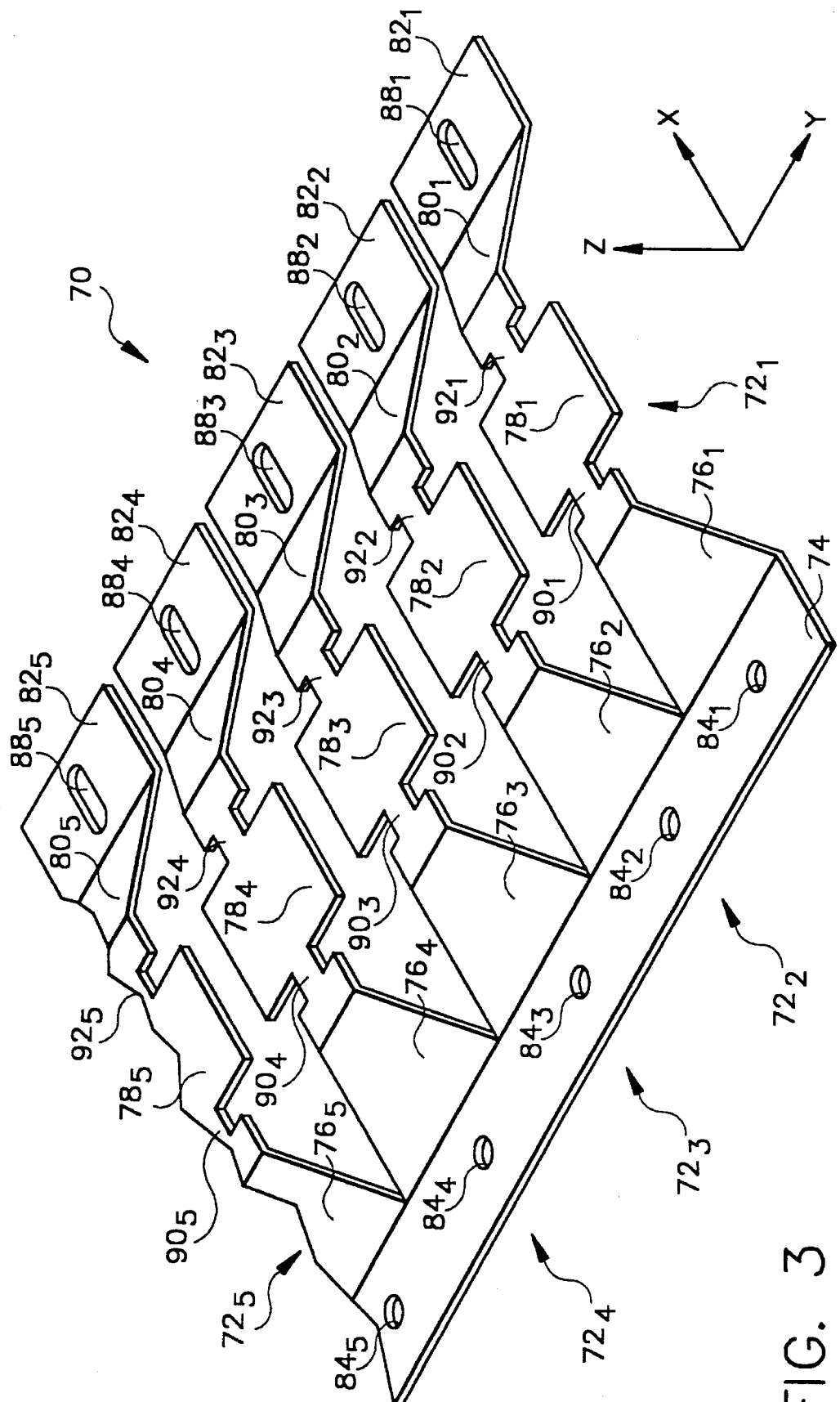
FIG. 3 is a partial perspective view of an elongated flexure support for individually suspending magnetic recording head elements in relation to the MOF layer of a filmstrip in the camera of FIG. 1.

Returning to FIG. 1, the unitary flexure support 70 is depicted suspending the magnetic recording head 60 in the elongated opening 12 on the downstream side of the exposure gate 26. FIG. 3 shows a portion of the elongated unitary flexure support 70 in a perspective view. Compliance is attained by individually attaching the recording head elements $62_1$–$62_n$ on separated suspension flexure elements $72_1$–$72_n$ of a unitary flexure support 70 attached to the backing plate 18 and extending through the elongated opening 12 so that the head elements can individually pitch and roll with changes in the cross-film curvature and forces applied by the moving filmstrip 10.

The elongated unitary flexure support 70 is made from a single piece of flexure material, typically stainless steel, which is stamped from one piece into the pattern and inverted gull wing shapes of the individual flexure elements $72_1$–$72_n$. Preferably, the flexure support 70 is stamped, etched, and formed from a single uniform thickness sheet of yieldable metal between 80–120 μm thick.

Each flexure element 72 extends from a common elongated mounting plate 74 along a fixed leg 76 through a mounting platform 78 and then along a sliding leg 80 to a movable mounting pad 82. Each flexure element $72_1$–$72_n$ supports a magnetic recording head element $62_1$–$62_n$ (not shown) adhered to the mounting platforms $78_1$–$78_n$. Recording head wiring extending from each such recording head is adhered to the fixed legs $76_1$–$76_n$ and attached to the signal line 56 of FIG. 1.

The round holes $84_1$–$84_n$ in mounting plate 74 are intended to be swaged or receive mounting screws $86_1$–$86_n$ or otherwise fixedly attached to either side of the backing plate 18 as shown in FIG. 1, for example. The elongated holes $88_1$–$88_n$ in the movable mounting pads $82_1$–$82_n$ are intended to operate as slide guides and receive slide retaining posts or screws $98_1$–$98_n$ attached to backing plate 18 on the other side of elongated opening 12. Individual roll and pitch motion of each of the flexure elements $72_1$–$72_n$, and the respective magnetic recording head element $62_1$–$62_n$, is allowed in response to the uneven pressures exerted by the filmstrip 10 on each recording head element $62_1$–$62_n$.

The sloped flexure legs $76_1$–$76_n$ and $80_1$–$80_n$ are preferably reinforced with edge rails, and the formed bending stresses are relieved by heat treatment. The roll motion is achieved by necking-down the flexure legs $76_1$–$76_n$ and $80_1$–$80_n$ just fore and aft of the head mounting platforms $78_1$–$78_n$ into webs $90_1$–$90_n$ and $92_1$–$92_n$. The thickness of the flexure support stamping and the width of the webs $90_1$–$90_n$ and $92_1$ $92_n$ are the dominant factors in determining the roll torsional stiffness. The pitch motion is achieved by the coupling action of the sloped flexure legs $76_1$ $76_n$ and $80_1$–$80_n$ of each flexure element $72_1$–$72_n$ (i.e. as one leg flattens-out, the other bends).

The virtual pivot or axis of rotation for pitch motion is shown in FIGS. 4–7, where the imaginary planes extending from the two sloped flexure legs intersects. The slopes of the flexure legs $76_1$–$76_n$ and $80_1$–$80_n$ are designed such that the virtual pivot is created exactly where the gaps of the respective recording head elements $62_1$–$62_n$ will be located. In these configurations, as each recording head pitch changes dynamically, the head gap remains in contact or at a uniform separation from the MOF layer. The pitch stiffness is largely determined by the flexure bending stiffness of the formed joints in the inverted gull wing shape of each individual flexure element 72.

In the embodiments of FIGS. 3 and 4, the head loading or Z-direction of applied force from the filmstrip 10 results in Z-direction motion of the head element. The Z-direction motion is achieved by fixed flexure legs 76 being fixed in place while the other flexure leg 80 constrained in the X and Z degrees of freedom, but allowed to slide in the Y (film feed) direction. The load force necessary to effect the Z-direction motion in this case is determined by the flexure bending stiffness at the two lower joints where each leg 76 and 78 is attached to an elongated plate 74 and a sliding plate 82.

FIG. 5 depicts a variation in the design of the flexure legs $76_1$–$76_n$ and $80_1$–$80_n$ incorporating the accordion folds 100, 102 to form an additional set of joints and exhibit a greater degree of Z-direction motion flexibility.

It should be noted that the backing plate 18 is spring loaded so that the mounting of the flexure support 70 to the backing plate 18 additively provides a further flexibility in the Z-direction to all of the recording head elements.

Another approach by which the desired head loading can be achieved, is by substituting a further elongated plate 75 for the movable mounting pads $82_1$–$82_n$ and suspending both plates 74 and 75 on a further flexible suspension mechanism. This mechanism can be provided by independent springs 100, 102 as shown in FIG. 6, or by a cantilever spring(s) 104 as in FIG. 7. In these cases, plates 74 and 75 are fixed in position. In FIG. 7, the cantilever beam fixed end may be attached through an offset plate 106 to the backing plate 18.

Regardless of which suspension design is used, when employed in a multi-head array, the adjacent head flexures can act independently of one another, that is, the pitch, roll, and loading stiffness of each mounted recording head element is decoupled from the other recording heads. Thus, the head elements can assume a pattern in compliance with the cross-film curvature and longitudinal motion such as that shown in FIG. 2.

In this regard, the flexure elements $72_1$–$72_n$ of the above described embodiments of the flexure support 70 can each be made independently and separately mounted to the backing plate 18.

Preferably, the flexure stiffness is in the range of 30–100 μNm/deg in the pitch (film feed) direction, 5–30 μNm/deg in the roll direction, and the penetration or loading stiffness in the Z-direction is 0.02–0.10 N with a spring constant of less than 25 N/m. These measurements were made utilizing an inertia method employing a photonic probe sensing the light reflected from the surface of a block of known mass attached to the mounting platforms $78_1$–$78_n$ and freely oscillating. From the known mass and measurements of the natural frequency of oscillation in each direction, the stiffnesses in the pitch and roll directions may be calculated.

Figure 8:
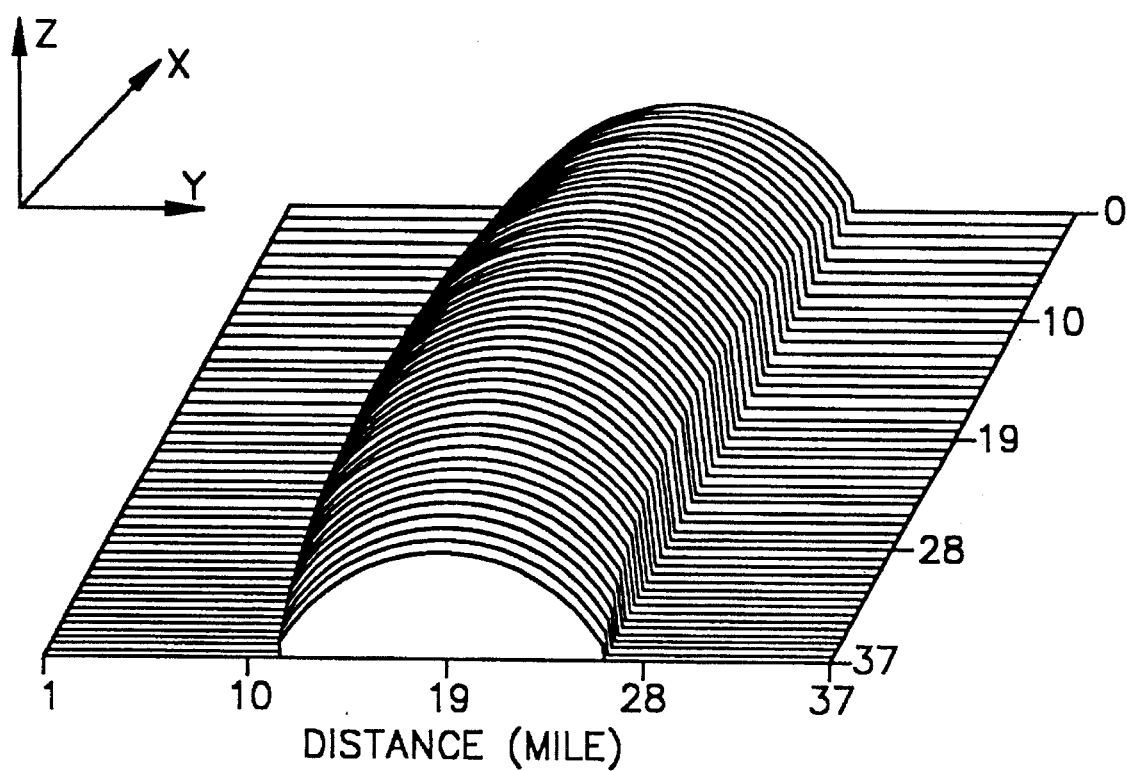
FIG. 8 is a topological drawing of the profile of a recording head element suitable for use in the present invention.

In all of the above embodiments, it is desirable that the individual head elements $62_1$–$62_n$ be shaped with prolate ellipsoid surfaces that contact the MOF layer so that there are no sharp edges in the cross-film X-direction or longitudinal Y-direction. These edges of each recording head element may be blended into the sides of the head elements by lapping or polishing. The resulting head profile is bidirectionally crowned in a manner shown in the computer drawn topological illustration of a lapped recording head element of FIG. 8. This shaping provides a sliding surface against the MOF layer of the filmstrip 10 in the positions of the individual head elements $62_1$–$62_n$ as shown in FIG. 2.

The radii of curvature of the sliding surface may be determined by the ratio $1.7 < R_x/R_y < 16.0$ where $R_x$ and $R_y$ are the radii of curvature across the trackwidth and in the film transport direction, respectively. The width of each recording head element 62 in the trackwidth or X-direction is from 0.3–1.0 mm, and the length of each recording head element 62 in the Y-direction is from 0.7–2.0 mm. The edges of the sliding surface of each recording head element 62 are blended by lapping or polishing to a minimum radius of 0.25 mm. The recording head element height in the Z-direction above the surface of the mounting plate ranges from 50–125 µm.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–8 filmstrip 10
MOF or magnetic layer 11
elongated record/reproduce opening 12
film rails 14, 16
backing plate 18
camera 20
housing 22
chamber 24
exposure gate opening 26
camera taking lens 28
film cartridge 30
film take-up chamber 32
take-up spool 34
camera back 36
electronic control system 40
sensor inputs 42
camera controls 44
microprocessor 46
ROM 48
RAM 50
read/write electronics block 54
signal line 56
magnetic recording head 60
multi-head array recording head elements $62_1$–$62_n$
flexure support 70
flexure elements $72_1$–$72_n$
elongated mounting plates 74, 75
fixed flexure legs $76_1$–$76_n$
mounting platforms $78_1$–$78_n$
movable flexure legs $82_1$–$82_n$
movable mounting pads $82_1$–$82_n$
round holes $84_1$–$84_n$
mounting screws $86_1$–$86_n$
webs $90_1$–$90_n$
webs $92_1$–$92_n$
slide retaining screws $96_1$–$96_n$
springs 100, 102
cantilever beam 104
offset plate 106

We claim:

1. Magnetic record/reproduce apparatus for recording and/or reproducing information in relation to image frame areas of a photographic filmstrip in a substantially transparent magnetic layer on a surface of the photographic filmstrip, said filmstrip having a cross-film curvature across the width thereof, said apparatus comprising:

means for defining an elongated filmstrip transport path having a backing plate with a record/reproduce aperture on one side of the filmstrip transport path;

means for advancing said filmstrip in a longitudinal direction in said filmstrip transport path from a filmstrip supply to a filmstrip takeup, whereby said filmstrip advanced alongside said backing plate exhibits said cross-film curvature and the space between said backing plate and said filmstrip magnetic layer varies across the width thereof;

a plurality of magnetic recording heads adapted to be suspended with respect to said backing plate to extend across said filmstrip in a spaced apart array for recording and/or reproducing information in tracks in said magnetic layer, said tracks extending in said longitudinal direction and across said image frame areas; and suspension means having a like plurality of flexure elements for suspending each of said plurality of magnetic recording heads in said array within said variable space in loading contact compliance with said cross-film curvature of said filmstrip magnetic layer, each flexure element having a mounting platform for mounting a magnetic record/reproduce head and first and second movable flexure legs attached at opposite ends thereof and extending from said backing plate into said record/reproduce aperture and toward said filmstrip magnetic layer to provide loading force through said magnetic record/reproduce head against said magnetic layer, said mounting platform having means for allowing roll motion of said magnetic head mounted to said mounting platform to conform with said cross-film curvature across the contact width of said recording heads with said magnetic layer.

2. The apparatus of claim 1 wherein said first and second legs and said mounting platform of each of said flexure elements is formed of a thin, resilient material into a gull wing shaped suspension spring member having said mounting platform intermediate said first and second angled legs and extending toward said filmstrip transport path and providing said magnetic record/reproduce head mounted thereto with the capability for pitch motion to conform with changes in tension in the advancement of said filmstrip past said record/reproduce aperture in said longitudinal direction, said pitch motion effected through bending motion of said first and second angled legs.

3. The apparatus of claim 2 wherein:

said magnetic recording heads each have a magnetic recording gap at a recording head contact surface for contacting said filmstrip magnetic layer; and said first and second legs are angled in planes that intersect at said magnetic recording head gaps at said recording head contact surfaces, whereby said recording head gap is maintained in contact with said filmstrip magnetic layer when changes in filmstrip tension during longitudinal cause the magnetic recording head to pitch through bending motion of said first and second legs.

4. The apparatus of claim 2 wherein:

said magnetic recording heads each have a magnetic recording gap at a recording head contact surface for contacting said filmstrip magnetic layer; and said first and second legs are each formed in an accordion fold shape each having portions angled in planes that intersect at said magnetic recording head gap at said recording head contact surface, whereby said recording head gap is maintained in contact with said filmstrip magnetic layer when changes in filmstrip tension during longitudinal cause the magnetic recording head to pitch through bending motion of said first and second legs.

5. The apparatus of claim 2 wherein:

said backing plate is formed with a record/reproduce aperture extending across said filmstrip transport path; and said flexure elements are attached to be suspended across said record/reproduce aperture in parallel alignment with respect to one another such that said first and second legs and said magnetic recording heads mounted to said mounting plates extend into said record/reproduce aperture toward said filmstrip magnetic layer and across said variable spacing to position said magnetic record/reproduce head elements in said array and against said cross-film curvature of said filmstrip magnetic layer with a predetermined loading force.

6. The apparatus of claim 1 wherein:

said backing plate is formed with a record/reproduce aperture extending across said filmstrip transport path; and said flexure elements are attached to be suspended across said record/reproduce aperture in parallel alignment with respect to one another such that said first and second legs and said magnetic recording heads mounted to said mounting plates extend into said record/reproduce aperture toward said filmstrip magnetic layer and across said variable spacing to position said magnetic record/reproduce head elements in said array and against said cross-film curvature of said filmstrip magnetic layer with a predetermined loading force.

7. The apparatus of claim 2 further comprising:

means for fixedly attaching said first legs of each of said flexure elements to said backing plate; and means for slidably attaching said second legs with respect to said backing plate, whereby said flexure elements may be deflected away from said filmstrip magnetic layer by amounts varying in proportion to said varying space between said cross-film curvature and said backing plate.

8. The apparatus of claim 2 further comprising:

means for making fixed attachment of said first and second legs of each of said flexure elements to said backing plate.

9. The apparatus of claim 2 further comprising means for flexibly suspending each of said flexure elements with respect to said backing plate further comprising:

a cantilever beam having a first end and a second end;

means for attaching said first end of said cantilever beam to said backing plate; and means for making fixed attachment of said first and second legs of each of said flexure elements to said cantilever beam along said second end.

10. The apparatus of claim 2 further comprising means for flexibly suspending each of said flexure elements with respect to said backing plate further comprising:

first and second spring elements mounted at spaced apart positions on said backing plate; and means for making fixed attachment of said first and second legs of each of said flexure elements to said first and second spring elements, respectively.

11. The apparatus of claim 1 wherein said magnetic record/reproduce heads are shaped with a contoured profile in said cross-film direction for ensuring compliance with the filmstrip magnetic layer during roll motion of the magnetic recording head to conform with said cross-film curvature without causing damage to the filmstrip.

12. The apparatus of claim 11 wherein said magnetic record/reproduce heads are shaped with a contoured profile in said longitudinal direction for ensuring compliance with the filmstrip magnetic layer during pitch motion of the magnetic recording head to conform with changes in filmstrip advancement without causing damage to the filmstrip.

13. A photographic still camera for receiving an elongated filmstrip having a cross-film curvature and having a substantially transparent magnetic layer deposited on the film surface and for recording or reproducing information on or from the magnetic layer in relation to the exposure of image frames of the filmstrip comprising:

means for defining an elongated filmstrip transport path having a backing plate on one side thereof and spaced apart film rails on the other side thereof for guiding said filmstrip in said filmstrip transport path;

means for advancing said filmstrip in a longitudinal direction in said filmstrip transport path from a filmstrip supply to a filmstrip takeup between said film rails and said backing plate past a camera image frame exposure aperture between said film rails with said filmstrip magnetic layer facing said backing plate and having a concave cross-film curvature near one side of said exposure aperture, whereby the space between said backing plate and the concave filmstrip magnetic layer varies across the width thereof;

a plurality of magnetic recording heads adapted to be suspended with respect to said backing plate to extend across said filmstrip in a spaced apart array for recording and/or reproducing information in tracks in said magnetic layer, said tracks extending in said longitudinal direction and across said image frame areas; and suspension means having a like plurality of flexure elements for suspending each of said plurality of magnetic recording heads in said array within said variable space in loading contact compliance with said concave cross-film curvature of said filmstrip magnetic layer, each flexure element having a mounting platform for mounting a magnetic record/reproduce head and first and second movable flexure legs attached at opposite ends thereof and extending from said backing plate into said record/reproduce aperture and toward said filmstrip magnetic layer to provide loading force through said magnetic record/reproduce head against said magnetic layer, said mounting platform having means for allowing roll motion of said magnetic head mounted to said mounting platform to conform with said concave-film curvature across the contact width of said recording heads with said magnetic layer.

14. The camera of claim 13 wherein said first and second legs and said mounting platform of each of said flexure elements is formed of a thin, resilient material into a gull wing shaped suspension spring member having said mounting platform intermediate said first and second angled legs and extending toward said filmstrip transport path and providing said magnetic record/reproduce head mounted thereto with the capability for pitch motion to conform with changes in tension in the advancement of said filmstrip past said record/reproduce aperture in said longitudinal direction, said pitch motion effected through bending motion of said first and second angled legs.

15. The camera of claim 14 wherein:

said magnetic recording heads each have a magnetic recording gap at a recording head contact surface for contacting said filmstrip magnetic layer; and said first and second legs are angled in planes that intersect at said magnetic recording head gaps at said recording head contact surfaces, whereby said recording head gap is maintained in contact with said filmstrip magnetic layer when changes in filmstrip tension during longitudinal cause the magnetic recording head to pitch through bending motion of said first and second legs.

16. The camera of claim 14 wherein:

said magnetic recording heads each have a magnetic recording gap at a recording head contact surface for contacting said filmstrip magnetic layer; and said first and second legs are each formed in an accordion fold shape each having portions angled in planes that intersect at said magnetic recording head gap at said recording head contact surface, whereby each said recording head gap is maintained in contact with said filmstrip magnetic layer when changes in filmstrip tension during longitudinal cause the magnetic recording head to pitch through bending motion of said first and second legs.

17. The camera of claim 14 wherein:

said backing plate is formed with a record/reproduce aperture extending across said filmstrip transport path; and said flexure elements are attached to be suspended across said record/reproduce aperture in parallel alignment with respect to one another such that said first and second legs and said magnetic recording heads mounted to said mounting plates extend into said record/reproduce aperture toward said filmstrip magnetic layer and across said variable spacing to position said magnetic record/reproduce head elements in said array and against said cross-film curvature of said filmstrip magnetic layer with a predetermined loading force.

18. The camera of claim 13 wherein:

said backing plate is formed with a record/reproduce aperture extending across said filmstrip transport path; and said flexure elements are attached to be suspended across said record/reproduce aperture in parallel alignment with respect to one another such that said first and second legs and said magnetic recording heads mounted to said mounting plates extend into said record/reproduce aperture toward said filmstrip magnetic layer and across said variable spacing to position said magnetic record/reproduce head elements in said array and against said cross-film curvature of said filmstrip magnetic layer with a predetermined loading force.

19. The camera of claim 13 wherein said magnetic record/reproduce heads are shaped with a contoured profile in said cross-film direction for ensuring compliance with the filmstrip magnetic layer during roll motion of the magnetic recording head to conform with said cross-film curvature without causing damage to the filmstrip.

20. The camera of claim 13 wherein said magnetic record/reproduce heads are shaped with a contoured profile in said longitudinal direction for ensuring compliance with the filmstrip magnetic layer during pitch motion of the magnetic recording head to conform with changes in filmstrip advancement without causing damage to the filmstrip.

* * * * *